United States Patent
Deines

(10) Patent No.: US 9,523,180 B2
(45) Date of Patent: Dec. 20, 2016

(54) SEMI-AUTOMATIC MATERIAL LOADING

(71) Applicant: Deere & Company, Moline, IL (US)

(72) Inventor: Steven D. Deines, Marion, IA (US)

(73) Assignee: Deere & Company, Moline, IL (US)

( * ) Notice: Subject to any disclaimer, the term of this patent is extended or adjusted under 35 U.S.C. 154(b) by 10 days.

(21) Appl. No.: 14/263,602

(22) Filed: Apr. 28, 2014

(65) Prior Publication Data
US 2015/0308070 A1 Oct. 29, 2015

(51) Int. Cl.
E02F 3/34 (2006.01)
G05D 1/02 (2006.01)
E02F 3/43 (2006.01)
E02F 9/24 (2006.01)
E02F 9/26 (2006.01)
A01D 41/127 (2006.01)
G01S 19/14 (2010.01)
G01S 19/51 (2010.01)

(52) U.S. Cl.
CPC .......... E02F 3/434 (2013.01); E02F 9/24 (2013.01); E02F 9/262 (2013.01); E02F 9/265 (2013.01); A01D 41/127 (2013.01); G01S 19/14 (2013.01); G01S 19/51 (2013.01)

(58) Field of Classification Search
CPC ............ C01C 21/00; G01S 19/14; E02F 3/34
USPC ............ 701/50, 301, 32.3, 408; 342/357.27, 342/357.29; 37/348, 414
See application file for complete search history.

(56) References Cited

U.S. PATENT DOCUMENTS

| 6,114,993 | A | * | 9/2000 | Henderson | G01C 21/00 342/357.27 |
| 6,247,538 | B1 | | 6/2001 | Takeda et al. | |
| 2004/0136816 | A1 | * | 7/2004 | Pulli | B65G 47/18 414/340 |
| 2009/0319133 | A1 | * | 12/2009 | Ekvall | E02F 9/2029 701/50 |
| 2011/0040460 | A1 | * | 2/2011 | Velde | B60L 3/104 701/50 |
| 2012/0290178 | A1 | * | 11/2012 | Suzuki | E02F 9/2045 701/50 |

FOREIGN PATENT DOCUMENTS

JP 8-145673 A 11/1994
JP 11-124880 A2 10/1997

OTHER PUBLICATIONS

Shigeru Sarata, et al. Detection of Dump Truck for Loading Operation by Wheel Loader. 24th International Symposium on Automation & Robotics in Construction (ISARC 2007) Construction Automation Group, I.I.T. Madras, 4 pages.

* cited by examiner

Primary Examiner — Marthe Marc-Coleman
(74) Attorney, Agent, or Firm — Joseph R. Kelly; Kelly, Holt & Christenson PLLC

(57) ABSTRACT

A position of a loading device on a conveying vehicle, relative to a receiving area, is calculated. The loading device is automatically positioned based on the relative position. The relative position of the loading device relative to the receiving area is output. An operator input is received and material is automatically unloaded from the loading device to the receiving area.

21 Claims, 9 Drawing Sheets

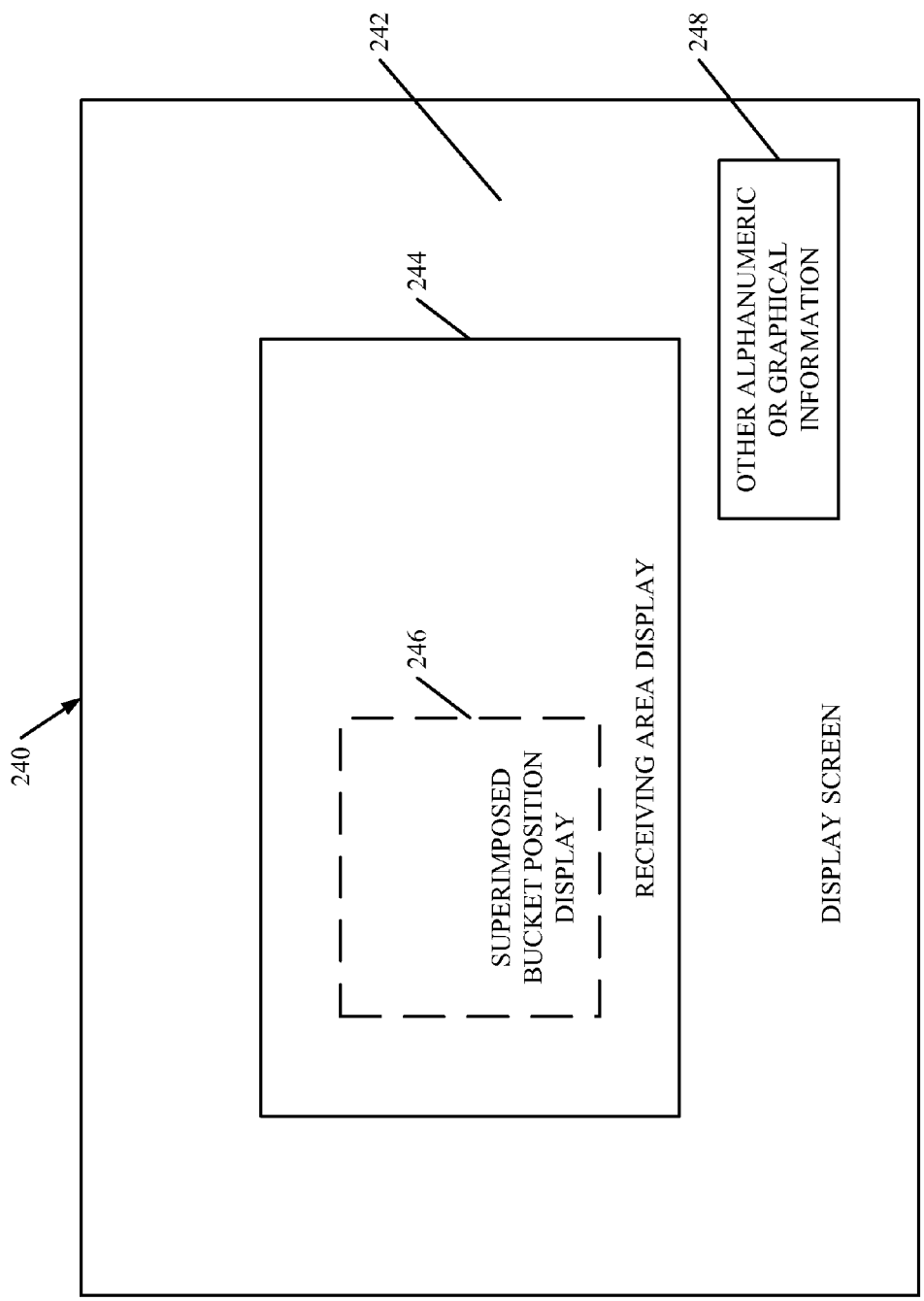

SEMI-AUTOMATIC MATERIAL LOADING

FIELD OF THE DISCLOSURE

The present disclosure relates to a vehicle for conveying material. More specifically, the present disclosure relates to semi-automatic loading of material using a conveying vehicle.

BACKGROUND

There are a wide variety of different environments in which conveying vehicles convey material to a target location. For instance, loaders working in a pile often have an operator compartment where an operator sits to operate the loader to load material from the pile into a dump truck. The loader can be any type of material loader, such as a tractor, a backhoe, a skid steer loader, or the like.

The loader can have a bucket that has a positioning system that is controlled by the operator to position the bucket. The bucket positioning system controls lift and tilt actuators (such as hydraulic cylinders, pneumatic cylinders, air over hydraulic cylinders, etc.). The loader also has a traction system, such as an engine that powers traction motors which, themselves, drive ground engaging wheels, tracks, or other traction mechanisms that are used to move the loader relative to the ground.

Some material conveyance (or loading) operations can be highly repetitive. For instance, where a loader is working in a pile, the operator controls the loader to repeatedly approach the pile to load the bucket, and then maneuver the vehicle so that the bucket is positioned over a target area where the load is dumped. The target area may be, for instance, the bed of a dump truck, or another target location.

Some work has been done in attempting to manufacture fully-automated loaders. In such systems, the goal is to fully automate the loading process so that an operator need not be involved, at all. These types of systems can have their own drawbacks.

The discussion above is merely provided for general background information and is not intended to be used as an aid in determining the scope of the claimed subject matter.

SUMMARY

A position of a loading device on a conveying vehicle, relative to a receiving area, is obtained. The loading device is automatically positioned based on the relative position. The position of the loading device relative to the receiving area is output. An operator input is received and material is automatically unloaded from the loading device to the receiving area in response to the operator input.

This Summary is provided only to introduce some concepts in a simplified form. The concepts are further described below in the Detailed Description. This Summary is not intended to identify either key features or essential features of the claimed subject matter, nor is it intended to be used as an aid in determining the scope of the claimed subject matter. Further, the claimed subject matter is not limited to implementations that solve any or all disadvantages noted in the background.

BRIEF DESCRIPTION OF THE DRAWINGS

FIG. 4 is a block diagram of one illustrative user interface display.

DETAILED DESCRIPTION

Figure 1:
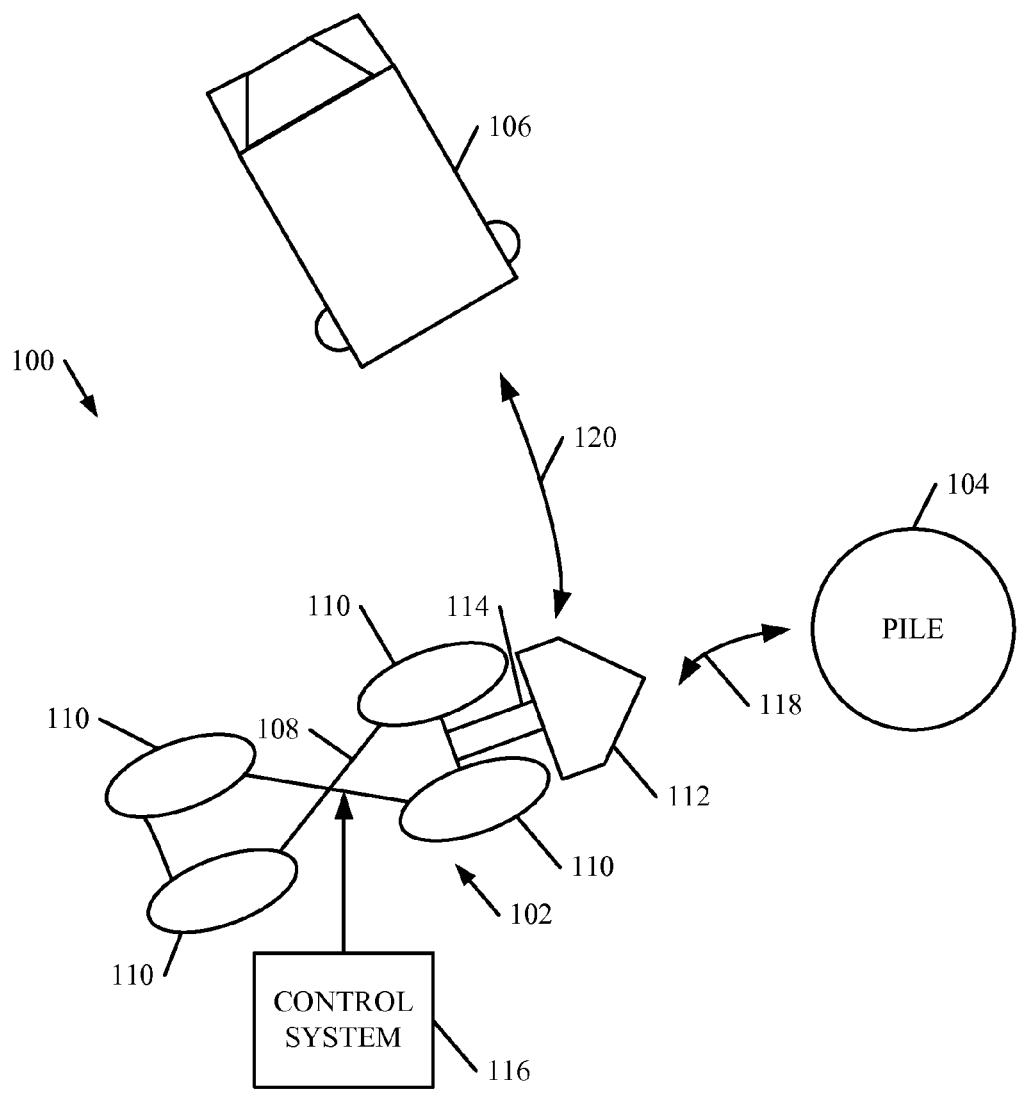
FIG. 1 is a pictorial illustration of one illustrative operating environment in which a loader is used for loading material into a dump truck.

FIG. 1 shows one embodiment of an environment 100 in which a loader 102 loads material located in pile 104 into the bed of a dump truck 106. It will be appreciated that the semi-automatic loading of material described herein can be used in a wide variety of different environments, where a conveying vehicle conveys material to a receiving area in a target location. Some of these environments are discussed below. However, for the sake of example, the present discussion will proceed primarily with respect to semi-automatic loading being performed in environment 100 in which the conveying vehicle is loader 102, the target is dump truck 106, and the receiving area is the bed of the dump truck 106. Other conveying vehicles, targets and receiving areas, some of which are described below, are contemplated herein as well. In the embodiment shown in FIG. 1, loader 102 illustratively includes a frame 108.

The frame 108 is illustratively attached to a set of traction mechanisms, such as wheels 110. It will be appreciated that the traction mechanisms can be tracks, or other traction mechanisms, and wheels 110 are shown for the sake of example only.

Loader 102 also illustratively includes a bucket 112 that is controlled by a set of actuators 114. Actuators 114 can illustratively include lift and tilt actuators that are used to position bucket 112 so that the user can dig material from pile 104 and dump it in the bed of dump truck —106.

Loader 102 also illustratively includes a control system, shown diagrammatically by box 116. Control system 116 illustratively receives a variety of inputs from sensors and from user input mechanisms and controls the operation of loader 102 based on those inputs. It will be appreciated that the components of control system 116 can include electronic components and mechanical, electromechanical or other components.

In any case, the operator illustratively resides in an operator compartment of loader 102 and provides inputs to control loader 102 to repeatedly engage pile 104 with bucket 112, along a loading path such as that illustrated by arrow 118. The operator then controls loader 102 to travel along an unloading path, such as that indicated by arrow 120. In doing so, the operator illustratively maneuvers loader 102 so that bucket 112 is positioned over the truck bed of dump truck 106, and then unloads the material that was loaded from pile 104, into the truck bed.

Some construction firms employ operators to load trucks and often ask them to do so as quickly as possible. The loading operators normally both maneuver the loader as well as orient the bucket to dig and dump the material into trucks. Such operators usually work long schedules and the efficiency of the operators' work tends to degrade over extended periods, sometimes to the point that some loads partially miss the truck beds or that operator error can cause unwanted contact between the loader and other items.

For instance, it is not uncommon for an operator to slightly misjudge the placement of the loader bucket relative to the bed of the dump truck. This can cause the operator to dump the load, when the two are misaligned, so that a portion of the load misses the truck. Further, if the operator slightly misjudges the relative position of the bucket and the truck, this can result in unwanted contact between the bucket and the truck.

Some work has been done to obtain fully automated systems. However, such fully automated systems are often incapable of providing the fine adjustments needed to accurately position the bucket relative to the dump truck. Further, because human judgment is removed from the fully-automated system, the system may operate in an unwanted way.

Figure 2A:
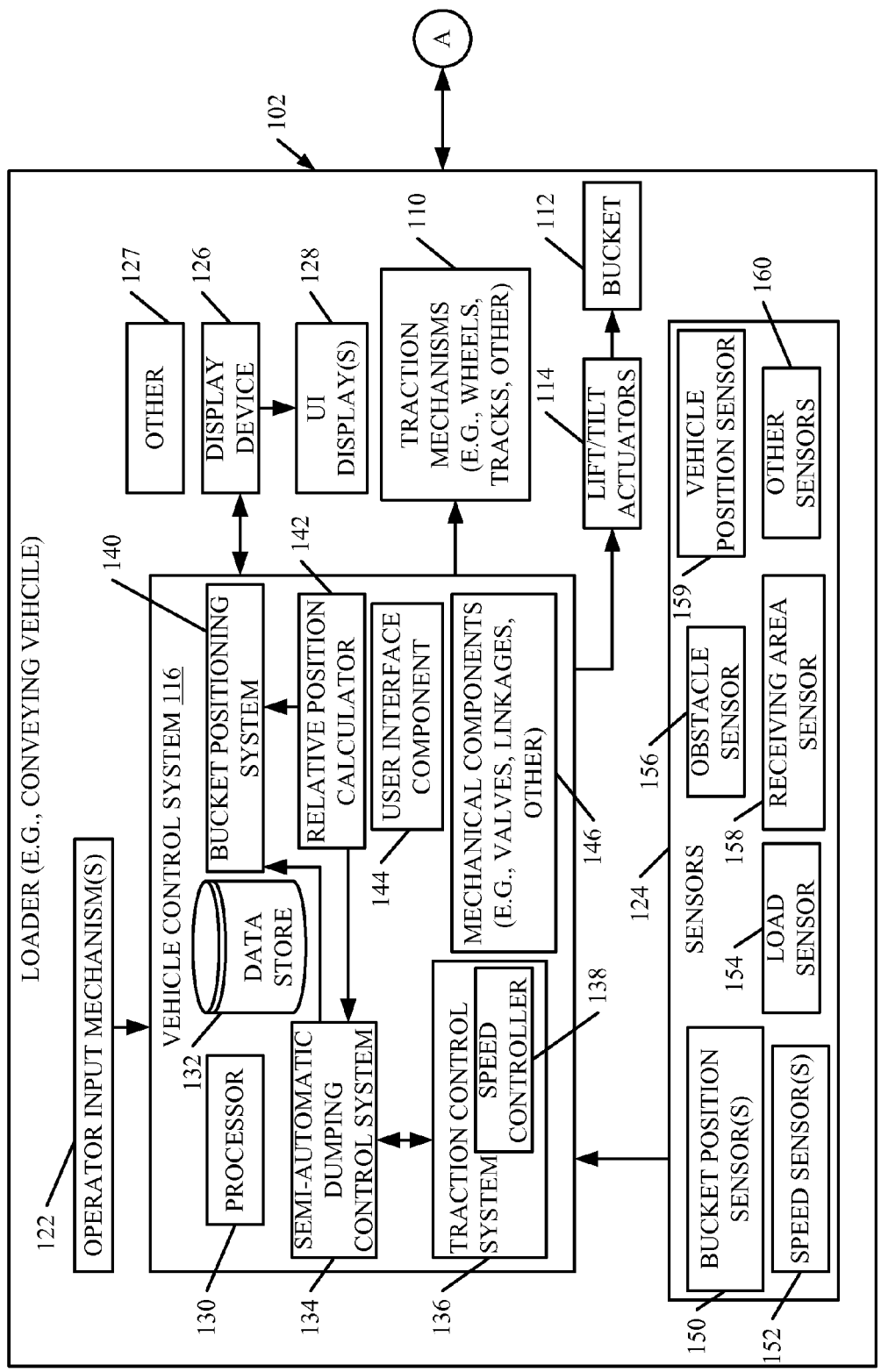
FIGS. 2A and 2B (collectively FIG. 2) show a more detailed block diagram of a conveying vehicle and a target.
Figure 2B:
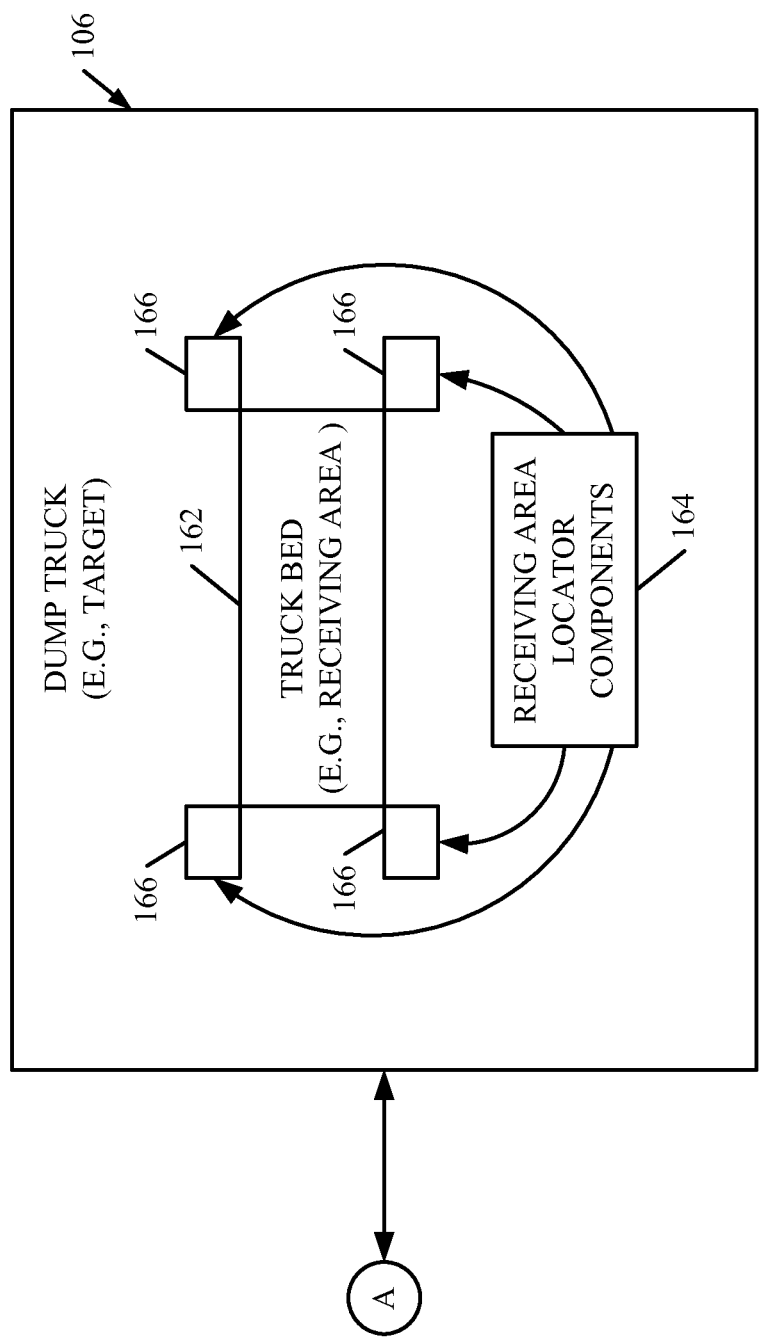

FIGS. 2A and 2B are collectively referred to herein as FIG. 2. FIG. 2 shows one embodiment of a more detailed block diagram of some of the components of loader 102, shown in FIG. 1. FIG. 2 also illustratively includes a block diagram of some of the components of dump truck 106. The items in FIG. 2 that are similar to those shown in FIG. 1 are similarly numbered. In the embodiment discussed herein, receiving area 162 is illustratively the truck bed of dump truck 106. However, in other embodiments, the receiving area can be a loading dock of a warehouse, or any of a wide variety of other receiving areas. Some of these are described in greater detail below.

Before describing the operation of vehicle 102 in loading material into the truck bed of truck 106, a brief description of the various components of loader 102 and dump truck 106 will first be provided.

FIG. 2 shows that the loader 102 illustratively includes operator input mechanisms 122, as well as sensors 124 both of which provide inputs to vehicle control system 116. Control system 116 provides outputs to control display device 126 (which can generate user interface displays 128), traction mechanisms (such as wheels) 110, lift and tilt actuators 114, and other components 127.

Vehicle control system 116, itself, illustratively includes processor 130, data store 132, semi-automatic dumping control system 134, traction control system 136 (which includes speed controller 138), bucket positioning system 140 that receives an input from a relative position calculator 142, user interface component 144, and it can also include mechanical components (such as valves, linkages, and other mechanical components) 146.

Sensors 124 illustratively include one or more bucket positioning sensors 150, speed sensors 152, load sensors 154, obstacle sensors 156, receiving area sensors 158 and position sensors 159. Sensors 124 can also include a variety of other sensors 160.

Operator input mechanisms 122 can include a wide variety of different types of mechanisms that can be actuated by an operator either within the operating compartment of loader 102, or outside the operator compartment. For instance, they can include joysticks, a steering wheel, levers, buttons, switches, triggers, foot pedals and other operator actuable input mechanisms. They can also include touch screen displays which allow the user to actuate user input mechanisms on a touch screen. Further, where vehicle control system 116 includes voice recognition components, the user input mechanisms can include a microphone for receiving voice commands.

Bucket position sensors 150 can include a set of sensors that provide sensor signals to vehicle control system 116 that can be used to calculate the position of bucket 112, relative to the frame of loader 102. For instance, they can include angle encoders that sense the angular orientation of the bucket relative to the boom (or lift arm) that supports it. They can also include sensors on the hydraulic cylinders, electric actuators, or other actuators that are used to lift and tilt the bucket 112. Such sensors provide an output that is indicative of the extent to which a given hydraulic cylinder (or other actuator) is extended. They can include other sensors as well.

Speed sensors 152 illustratively sense the speed that loader 102 is traveling over the ground. They can include wheel speed sensors that sense the speed of rotation of the wheels (or other traction mechanisms) 110. They can also include ground radar sensing systems that sense how quickly the ground is passing beneath the loader 102. Of course, they can include other speed sensors or speedometers as well.

Load sensor 154 illustratively provides a signal indicative of whether bucket 112 is carrying a load. This can include a strain gauge sensor or a variety of other types of sensors.

Obstacle sensor 156 illustratively includes a scanning laser sensor, or a radar sensor, or another type of sensor that can provide a signal indicative of the location of obstacles in the travel path (or near the travel path) of loader 102. It can also include a set of sensors, such as an infrared detector, that detects the presence of objects that have a detectable temperature.

Receiving area locator components 164 on dump truck 106 illustratively interact with receiving area sensor 158 in loader 102 so that loader 102 can sense the position and orientation of receiving area (or truck bed) 162. In one embodiment, receiving area sensor 158 can be a scanning laser system, and receiving area locator components 164 can comprise a set of corner cube reflectors 166 that are placed at the corners of the truck bed, to mark the location of the corners (or periphery) of the truck bed.

In one embodiment, the corner cube reflectors are arranged such that, when a laser beam is impinged on them, the laser beam is reflected back in the same direction, and with approximately the same intensity, as the impinging beam. Thus, receiving area sensor 158 provides a signal indicative of the direction and intensity of the received reflections (or returns) to vehicle control system 116 which can then calculate the location and orientation of the truck bed, relative to loader 102.

Vehicle position sensor 159 illustratively provides a signal indicative of the location or position of loader 102. It can include, for instance, a GPS receiver, a LORAN system, a dead reckoning system, or a variety of other systems (either alone or in combination) which provide one or more sensor signals indicative of the location, and possibly orientation, of loader 102. Other sensors 160 can include a wide variety of sensors, such as seat belt or other interlock sensors, operator presence sensors, door lock sensors, and a wide variety of other sensors.

In vehicle control system 116, processor 130 is illustratively a computer processor which is described in greater detail below. It illustratively is activated by the various components and systems in vehicle control system 116 and facilitates their functionality. Data store 132 illustratively stores data that can be operated on by processor 130. The data can include raw data, applications, an operating system, communication programs, or other programs or algorithms, as well as a wide variety of other information.

Bucket positioning system 140 illustratively receives an input from relative position calculator 142. Relative position calculator 142 illustratively receives inputs from bucket position sensors 150 and calculates the position of bucket 112, relative to the frame of loader 102. Bucket positioning system 140 also illustratively receives inputs from operator input mechanisms 122. The operator inputs indicate that the operator is positioning bucket 112. For instance, the operator input mechanisms 122 can be one or more joysticks that provide lift and tilt signals indicating that the operator wishes to lift and tilt bucket 112. In response to the input signals, bucket positioning system 140 controls lift and tilt actuators 114 to position bucket 112, based upon the input signals. By way of example, bucket positioning system 140 can energize solenoids in hydraulic valves (based on the input signals) to control the flow of hydraulic fluid to lift and tilt actuators 114 in order to raise and lower bucket 112, and in order to tilt it. Of course, bucket positioning system 140 can control lift and tilt actuators 114 in other ways as well, and energizing a solenoid is only one example.

Traction control system 136 illustratively receives inputs from speed sensors 152 as well as operator input mechanisms 122 and controls traction mechanisms (e.g., wheels) 110 to move loader 102, as desired by the operator. For instance, the operator input mechanism 122 can be an accelerator or brake pedal, or a throttle mechanism. These mechanisms can communicate mechanically with, or provide other inputs to, traction control system 136. Speed controller 138 then illustratively controls the speed of the wheels 110 based upon those inputs. The operator input mechanisms 122 also illustratively include a shifting mechanism that is indicative of the operator placing loader 102 in forward, reverse, neutral, etc. Thus, traction control system 136 can control the wheels 110 to move the vehicle in the desired direction, at a desired speed.

In one embodiment, as is discussed below, speed controller 138 also receives inputs from receiving area sensors 158, obstacle sensors 156, and bucket position sensors 150, and calculates a rate at which loader 102 is approaching either an obstacle or the dump truck 106. It also illustratively calculates the rate at which bucket positioning system 140 is raising, lowering, or otherwise positioning bucket 112. Speed controller 138 then controls the speed of movement of loader 102 to ensure that the bucket 112 is raised to an appropriate level so that it does not contact any detected obstacle, or dump truck 106. This is described in greater detail below with respect to FIGS. 3A-3C.

Semi-automatic dumping control system 134 illustratively receives input signals from relative positioning calculator 142 indicating the position of bucket 112, relative to the frame of loader 102. It also illustratively receives inputs from receiving area sensor 158 (and possibly other sensors, such as vehicle position sensor 159, or other sensors). Control system 134 performs a calculation to identify the relative position and orientation of bucket 112, relative to the truck bed (or other receiving area) 162. It also illustratively provides an output signal to bucket positioning system 140 so that bucket positioning system 140 raises bucket 112 (and possibly tilts it as well) to position it over the truck bed 162, prior to dumping. Semi-automatic dumping control system 134 also generates a user interface output, such as a display 128, an audio output, a haptic output or another output. The user interface output indicates the relative position of bucket 112 and truck bed 162. In an example embodiment, the user interface display 128 (one of which is described in greater detail below with respect to FIG. 4), displays the relative position of bucket 112 and the truck bed 162 so that the operator can confirm that the bucket 112 is in proper dumping position over the truck bed, prior to initiating the dumping operation. Thus, in one embodiment, vehicle control system 116 receives sensor inputs indicative of one or more conditions and parameters so that semi-automatic dumping control system 134 can automatically control the position of bucket 112 and display (or otherwise indicate) its position, relative to the truck bed, so that the operator simply needs to maneuver loader 102, as desired. When the user interface output (e.g., display 128) indicates that the operator has maneuvered loader 102 so that bucket 112 is in the proper dumping position relative to the truck bed 162, the operator actuates a dumping user input mechanism (such as a switch, a trigger, etc.). In response to the operator actuating the dumping user input mechanism, semi-automatic dumping control system 134 provides a signal to bucket positioning system 140 to automatically control bucket 112 to dump the load into the truck bed and return the bucket to its original position over the truck bed. When the operator maneuvers loader 102 (e.g., reversing) so that the bucket is no longer over the truck bed, semi-automatic dumping control system 134 can automatically control bucket positioning system 140 to return bucket 112 to its travel position until it again approaches the pile 104. At that point, semi-automatic dumping control system 134 illustratively controls bucket positioning system 140 to return bucket 112 to its digging (or loading) position. The operator can then obtain a new load from pile 104, and the semi automatic dumping process repeats.

Figure 3A:
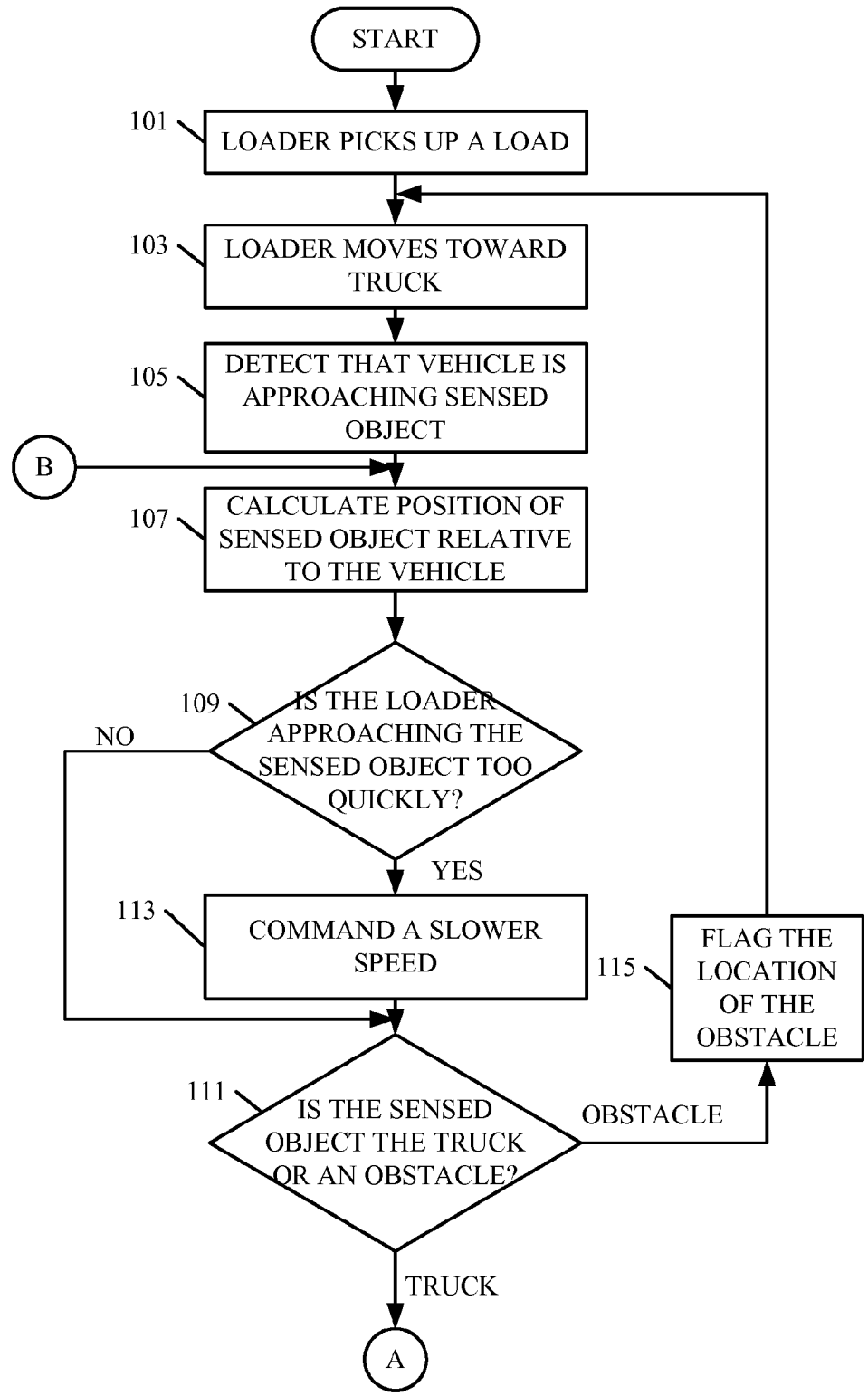
FIGS. 3A-3B (collectively FIG. 3) show a flow diagram illustrating one embodiment of the operation of the conveying vehicle shown in FIG. 2.
Figure 3B:
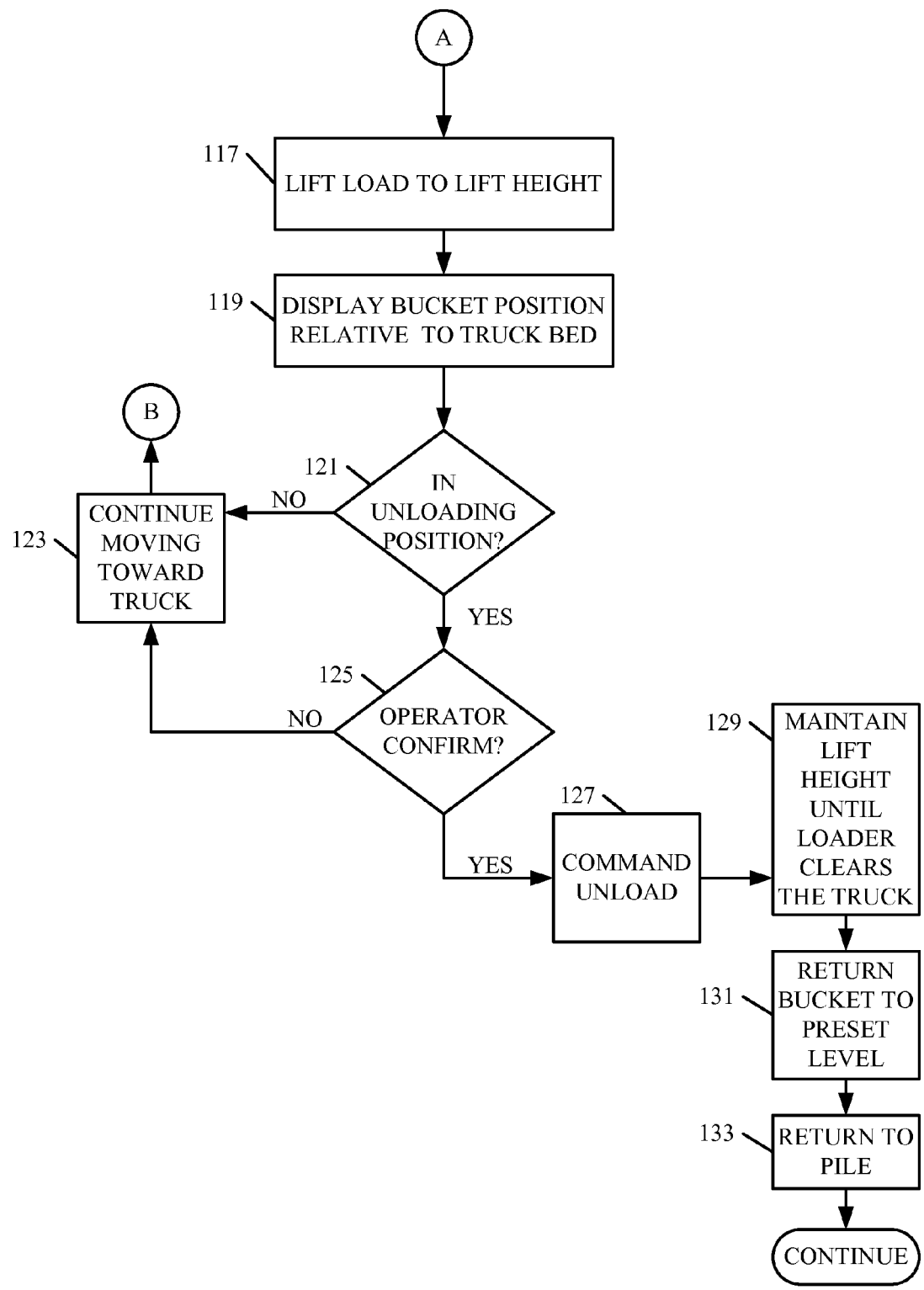

FIGS. 3A and 3B show one simplified flow diagram illustrating the operation of vehicle control system 116 in controlling the loader 102 to perform the semi-automatic dumping process. The examples described herein will refer to the user interface output that indicates the relative position of the bucket and the truck bed as being a display. It can also be other types of outputs (such as audio, haptic, etc.). It will be appreciated that a display is just one example.

In one embodiment, the loader 102 first picks up a load in the pile. This is indicated by block 101. The loader then begins to move toward dump truck 106. This is indicated by block 103.

Either optical sensor 156 or receiving area sensor 158 senses that the vehicle is approaching a sensed object. This is indicated by block 105. Vehicle position sensor 159 provides an input to system 116 so that system 116 can calculate the position of vehicle 102 relative to the sensed object. This is indicated by block 107. System 116 then determines whether vehicle 102 is approaching the sensed object too quickly. For instance, it may be approaching too quickly if the bucket will come into unwanted contact with the object before the loader has a chance to lift the bucket to a position where it will clear the sensed object. This is indicated by block 109. If not, processing continues below with respect to block 111. However, if the vehicle 102 is approaching the sensed object too quickly, then speed controller 138 commands a slower speed. This is indicated by block 113 in FIG. 3A.

System 116 then determines whether the sensed object is the truck 106 or some type of obstacle. This is indicated by block 111. If it is an obstacle, then control system 116 flags the location of the obstacle and processing continues at block 103 where the loader continues to move toward the dump truck. Flagging the location of the obstacle is indicated by block 115.

If, at block 111, it is determined that the sensed object is the dump truck, then bucket positioning system 140 begins to lift the load to the appropriate lift height where it can be positioned over the truck bed 162. This is indicated by block 117. User interface component 144 generates a user interface display that shows the bucket, as it is positioned relative to the truck bed. This is indicated by block 119. This is described in greater detail below with respect to FIGS. 3C and 4.

Control system 134 then determines whether the bucket is in the proper unloading position relative to the truck bed. This is indicated by block 121. If not, then processing continues at block 123 where the loader 102 continues to move toward the truck bed. However, if it is determined at block 121 that the bucket is in proper dumping position, then user interface component 144 generates a user interface display, or another user output, indicating that the user is to confirm that the dumping operation should commence. This is indicated by block 125. If the operator does not confirm this, then processing again continues at block 123 where the operator can continue to maneuver the loader relative to the dump truck.

However, if the operator does confirm that the dumping operation is to proceed, then system 134 commands the lift/tilt actuators 114 to dump bucket 112. This is indicated by block 127. System 134 maintains the lift height of the bucket until the loader clears the truck, as the loader backs away from the truck. This is indicated by block 129. Once the bucket has cleared the truck, system 134 returns the bucket to a preset level while loader 102 is traveling back to the pile 104 (shown in FIG. 1). Returning the bucket to the preset level is indicated by block 131, and returning to the pile is indicated by block 133.

Figure 3C:
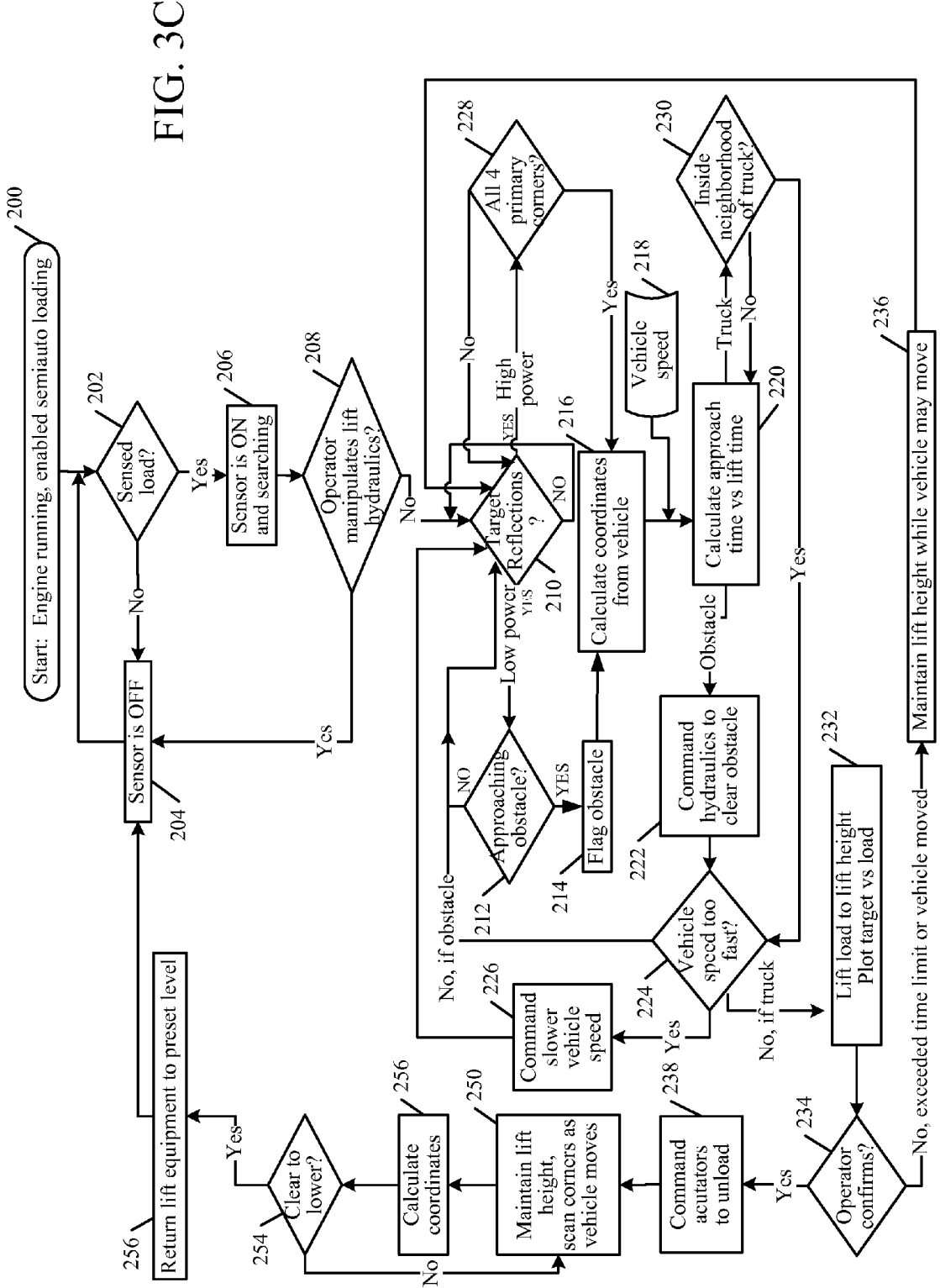
FIG. 3C shows a more detailed flow diagram of one embodiment of the operation of the conveying vehicle shown in FIG. 2.

FIG. 3C is a more detailed flow diagram illustrating one embodiment of the operation of vehicle control system 116 in controlling loader 102 to perform the semi-automatic dumping process. It is first assumed that the operator has started the loader so that the engine is running and that the operator has provided an input, through a suitable operator user input mechanism 122, enabling semi-automatic dumping control system 134 to perform the semi-automatic dumping process. This is indicated by block 200 in FIG. 3.

Semi-automatic dumping control system 134 illustratively controls the various components of vehicle 102 in an efficient way. For instance, when load sensor 154 provides a signal indicating that bucket 112 does not have a load in it, then there is no need to activate receiving area sensors 158, because the loader 102 will not normally be approaching the dump truck without a load. Thus, semi-automatic dumping control system 134 determines whether load sensor 154 is providing a signal indicating that a load is present in bucket 112. This is indicated by block 202. If not, then system 134 illustratively shuts off receiving area sensor 158, and other systems or sensors that are not being used. This is indicated by block 204 in FIG. 3.

Once load sensor 154 provides a signal indicating that a load is present in bucket 112, semi-automatic dumping control system 134 illustratively powers up the various sensors and systems that are used in performing the semi-automatic dumping process. This is indicated by block 206 in FIG. 3.

In one embodiment, once bucket 112 is loaded, the operator may provide a manual input to manipulate lift or tilt actuators 114. In that case, semi-automatic dumping control system 134 interprets this as the operator taking manual control of the dumping process. Therefore, system 134 again shuts off the various sensors and systems that are used in performing the semi-automatic dumping control process, because the user is now controlling that process manually. Determining whether the operator has actuated one of the lift or tilt actuators 114 is indicated by block 208 in FIG. 3.

Assuming, at block 208, that the user has not decided to take manual control of the dumping process, then obstacle sensor 156 and receiving area sensor 158 are illustratively looking for obstacles, and for the location and orientation of the truck bed 162. In one embodiment, obstacle sensor 156 and receiving area sensor 158 are the same sensors. That is, they can be radar sensors, scanning laser sensors, etc. The present description will proceed with respect to obstacle sensor 156 being a radar sensor and sensor 158 being a laser scanning sensor. However, this is exemplary only.

In such an embodiment, when the scanning laser that comprises receiving area sensor 158 impinges the laser on the receiving area locator components (such as the cube reflectors), the returning reflections are relatively high power, relative to returning reflections from other objects (which are not mirrors). Therefore, as loader 102 approaches dump truck 106 the sensor 158 will eventually receive some reflections, either from an object, or from the cube reflectors on the truck bed.

When the scanning laser 158 is receiving reflections from fewer than a predetermined number (e.g., all four) of the cube reflectors 166, then the power of the returning reflections (as when an obstacle is being sensed) will also be lower than if it is receiving reflections from the predetermined number (e.g., all four) of the cube reflectors 166. Thus, at some point, the sensor will receive target reflections that are either high power reflections (indicating that the sensor 158 is receiving reflections from all four cube reflectors 166) or lower power reflections (indicating that the sensor is receiving reflections from either fewer than all of the cube reflectors 166, or from another object that is in a path of the impinging laser beam). Determining that the sensor 158 is receiving some type of target reflections is indicated by block 210 in FIG. 3.

If the reflections are quite low power, this indicates to control system 134 that none of the reflections are from any of the cube reflectors 166. Therefore, they are from some other object. Control system 134 thus checks the obstacle sensor 156 to determine whether loader 102 is approaching an obstacle in its travel path. This is indicated by block 212. If not, this indicates that the object is being sensed by the sensor 158, but it is not in the travel path of loader 102, and processing reverts back to block 210. However, if, at block 212, control system 134 determines that loader 102 is approaching an obstacle, then control system 134 sets a flag indicating that an obstacle has been detected in the path (or near the path) of loader 102. This is indicated by block 214 in FIG. 3.

Control system 134 then illustratively calculates the relative coordinates of the obstacle, relative to the position of loader 102. This is indicated by block 216, and it can be done in a variety of different ways. For instance, system 134 can use the vehicle position or location signal from sensor 159 to identify the location of the vehicle. It can then use the various sensor inputs from obstacle sensor 156 or receiving area sensor 158 (or the combined sensors) to determine where the obstacle is relative to loader 102.

Once the relative locations of the obstacle and loader 102 have been calculated by system 134, system 134 receives a vehicle speed indicator signal from speed sensor 152. This is indicated by block 218 in FIG. 2. System 134 then calculates the approach time (the time it will take to reach the obstacle) versus the lift time (the time it will take to lift bucket 112 to an obstacle avoidance position where it will avoid the obstacle). This is indicated by block 220 in FIG. 3.

Control system 134 then provides an output signal to bucket positioning system 140 to control the lift actuator 114, so that it lifts bucket 112 to a position where it will clear the obstacle. This is indicated by block 222 in FIG. 3. System 134 then determines whether the loader 102 is moving too fast, so that the bucket will not be lifted clear of the obstacle before the loader reaches the obstacle. This is indicated by block 224 in FIG. 3. If the vehicle speed is not too fast, then system 134 has determined that the bucket 112 will clear the obstacle by the time loader 102 arrives at the obstacle, and processing simply continues at block 210. However, if, at block 224, it is determined that the vehicle speed is too fast (so that bucket 112 is not movable to an obstacle avoidance position where it will clear the obstacle by the time the loader 102 reaches the obstacle), then control system 134 provides an output to traction control system 136 (and specifically speed controller 138) to reduce the travel speed of loader 102. This is indicated by block 226 in FIG. 3. When the vehicle speed has been reduced to a sufficient level so that the lift rate of bucket 112 will lift the bucket 112 to a position where it will clear the obstacle in time, processing again reverts back to block 210.

Recall that, at block 210 in the flow diagram of FIG. 3, the sensors are receiving target reflections. Assume that control system 134 has detected that the target reflections are high power reflections. Control system 134 then determines whether the high power reflections are from the predetermined number (e.g., all four) primary cube reflectors 166. The present description proceeds with respect to the predetermined number of cube reflectors being all four cube reflectors. It will be appreciated that this is exemplary only and a higher or lower number can be the predetermined number.

In any case, determining whether the reflectors are from all four cube reflectors can be determined based on the power in the received reflections. If not, then control system 134 determines that it is still not receiving reflections from all four of the cube reflectors that mark the corners of the truck bed. Thus, processing reverts again to block 210 where sensor 158 continues scanning for the cube reflectors. Determining whether the reflections are from all four corners of the truck bed is indicated by block 228 in FIG. 3.

If, at block 228, control system 134 determines that it is receiving reflections from all four cube reflectors, then processing continues at block 216. Control system 134 thus calculates the coordinates of the truck bed, and its position and orientation relative to the position of bucket 112. This can be done using the power and phase of the returned reflections as well as the direction they are received from. Control system 134 then again receives the vehicle speed signal as indicated by block 218 and calculates the approach time of loader 102 versus the time required to lift bucket 112 (given a sensed lift rate) so that it will clear the top of the truck bed. This is indicated by block 220.

Because system 134 has determined that the reflections are from all four corners of the truck bed, processing continues at block 230, where system 134 determines whether it is within a predetermined radius of dump truck 106. If not, processing reverts to block 220 where control system 134 continues to calculate the approach time (the time it will take for loader 102 to reach dump truck 106) versus the lift time (the time it will take bucket positioning system 140 to lift bucket 112 so that it will clear the top of the truck bed).

At some point, control system 134 determines at block 230 that it is within a predetermined distance from the dump truck 106. Processing then continues at block 224 where control system 134 calculates whether loader 102 is approaching dump truck 106 too quickly (so that the bucket 112 will not be lifted above the top of the truck bed before it reaches dump truck 106). This is indicated by block 224. If loader 102 is approaching the dump truck 106 too quickly, then control system 134 commands traction control system 136 (and specifically speed controller 138) to reduce the travel speed of loader 102. This is indicated by block 226. Processing again reverts to block 210.

However, if, at block 224, it is determined that the travel speed of loader 102 is not too fast, and that bucket 112 will be lifted above the top of the truck bed before it reaches dump truck 106, then control system 134 provides a control signal to bucket positioning system 140. The control signal controls system 140 to lift bucket 112 to a desired lift height, where the bucket will clear the top of the truck bed. This is indicated by block 232 in FIG. 3.

As loader 102 approaches dump truck 106, control system 134 generates a user interface display 128 that displays the position of bucket 112, relative to the truck bed 162. This allows the operator to visually confirm when the bucket 112 is in proper dumping position above truck bed 162. FIG. 4 shows a block diagram of one embodiment of a user interface display 240 that can be generated to show this.

In the embodiment shown in FIG. 4, user interface display 240 is illustratively displayed on a display screen 242. Display screen 242 can be any of a wide variety of different types of display screens that are described below with respect to FIGS. 5 and 6. Display 240 illustratively includes a first display portion 244 that displays an outline of the receiving area (e.g., the truck bed). It further includes a second display portion 246 that shows an outline representing the bucket 112, as it is positioned relative to the truck bed. Thus, in the embodiment shown in FIG. 4, the bucket display portion 246 is superimposed over the truck bed display portion 244 to show whether bucket 112 is positioned in proper dumping position relative to truck bed 162. For instance, if bucket 112 were positioned such that it was only partially over the truck bed, then display portion 246 is displayed so that it is only partially within display portion 244. Thus, the user can quickly, visually verify whether bucket 112 is in the proper dumping position relative to the truck bed 162.

It will be appreciated that display 240 can include a wide variety of other information. For example, it can include alphanumeric or graphical information 248 that provides a variety of different data to the user. For instance, information 248 can indicate a distance that bucket 112 is from the truck bed 162, it can provide visual alerts when the two are not aligned, it can provide speed information, lift height information, and a wide variety of other information. The displayed information 248 can also illustratively include user actuatable input mechanisms, such as icons that can be actuated by the user in order to perform certain actions. In addition, where display screen 242 is a touch sensitive screen, the display can allow the user to perform certain actions using touch gestures.

Also, it is again noted that other operator interface components (other than a display) can be used instead of, or in addition to, the display. Such components can include audio components, haptic components, or other components.

In any case, and referring again to the exemplary flow diagram of FIG. 3, control system 134 illustratively generates the display so that the operator can quickly determine whether the bucket is in proper dumping position relative to the truck bed. Control system 134 then illustratively waits for an operator confirmation input, confirming that the operator wishes to continue with the dumping operation. Confirmation can be performed by actuating a thumb switch or a trigger switch or another switch on a joystick, on an operator control panel, or the user interface display, or in a wide variety of other ways. Determining whether the confirmation has been received by the operator is indicated by block 234 in FIG. 3.

If control system 134 does not receive a confirmation input, it simply waits for a predetermined time period to elapse. For instance, it may wait for a predetermined time period of 15 seconds, 30 seconds, or a longer or shorter time period. When the time period has elapsed, control system 134 controls bucket positioning system 140 to maintain the bucket at its current lift height, and processing reverts back to block 210. Maintaining the lift height of the bucket is indicated by block 236 in FIG. 3.

In another embodiment, when the time period has elapsed, or before, the operator can provide control inputs. For instance, the operator can adjust the position of the bucket relative to the truck and then perform the dumping operation. This is exemplary only.

If, at block 234, control system 134 does receive an operator confirmation input, then it provides a control signal to bucket positioning system 140 to actuate the tilt actuators 114 to dump or unload the load from bucket 112 into the truck bed. It then provides a control signal to bucket positioning system 140 to return bucket 112 to its non dumping position. Commanding the actuators 114 to unload is indicated by block 238 in FIG. 3.

Once the load has been dumped, or unloaded, then control system 134 provides a control signal to bucket positioning system 140 to maintain the lift height of bucket 112. Control system 134 also continues to receive the input signals from receiving area sensor 158, as the operator moves loader 102 away from dump truck 106. This is indicated by block 250 in FIG. 3.

While the operator is moving loader 102 away from dump truck 106, control system 134 continues to calculate the relative coordinates of the bucket and the dump truck 106. Once control system 134 determines that the bucket 112 is clear of the dump truck, so that it can be lowered, it illustratively returns bucket 112 to a preset level that is suitable for traveling between dump truck 106 and pile 104 (shown in FIG. 1). Calculating the relative coordinates of the bucket 112 and the dump truck 106 is indicated by block 252. Determining whether the bucket 112 is clear to lower is indicated by block 254, and returning the bucket to a preset level is indicated by block 256.

Once the bucket is returned to its preset level, processing continues at block 204 in FIG. 3. Control system 134 illustratively shuts off the various sensors and systems on loader 102, that are used during the semi-automatic unloading process.

It should also be noted that other operations can be performed as well. For instance, at any point in the processing of the flow diagram shown in FIG. 3, the operator may shut down loader 102. If this occurs, then system 134 illustratively exits from the semi-automatic dumping algorithm and shuts down the various electronics.

It will be noted that the embodiments discussed above are exemplary only. They can vary widely. For instance, the receiving area sensor 158 and receiving area locator components 164 illustratively comprise a remote sensing system. They are described herein as a scanning laser 158 interacting with the cube reflectors 166. Other embodiments can include radar systems, cameras, multi-camera systems or other image processing systems, transponders that send radio signals between the two vehicles, or other devices or systems. The radio signals can be provided, for instance, from a single antenna on both vehicles, or from multiple antennas to determine location and orientation. All such systems illustratively indicate a location and orientation of the receiving area such as by identifying a periphery (or a portion of the periphery) of the receiving area, or otherwise.

It will also be noted that the present discussion has proceeded with respect to the vehicle 102 being a loader, and the target 106 being a dump truck. However, this is exemplary only. The same concepts and implementations can be applied in other environments as well. For instance, vehicle 102 can be a fork lift where, instead of having a bucket 112, the vehicle is equipped with a fork. The target 106 can be a warehouse, and receiving area 162 can be a particular location on a loading dock where a pallet or other load is to be placed by the fork lift. In another embodiment, vehicle 102 is a harvester and target 106 is a box portion of a wagon or other crop receiver. Thus, the harvester will be delivering harvested material (through continuous or intermittent flow) into the receiving area (e.g., the receiving box) of the wagon. In that case, the harvester 102 may illustratively have a spout with an auger, instead of a bucket 112. The semi-automatic dumping control system 134 can provide a display indicating whether the output of the spout is properly located over the wagon for the material transfer to commence.

The same can be done where target 106 is a truck, that is being maneuvered so that its truck bed (e.g., the receiving area 162) is properly positioned beneath a hopper. In that case, system 134 can be on the target (e.g., the truck) for semi-automatically operating the truck. System 134 can provide the display or other operator interface to the truck driver to show that the truck bed is under the hopper. When the driver confirms this, the hopper door opens and material is dumped into the truck.

In another embodiment, vehicle 102 can illustratively be a tree handler that uses a grapple or other mechanism to lift trees or logs, and place them on a truck, for transport to a mill. Thus, instead of having bucket 112, the tree handler will have a grapple or other tree or log engaging mechanism. Control system 134 will thus generate a display indicating whether the logs, carried by the grapple, are positioned properly over the truck, for unloading.

In other embodiments, the material conveying vehicle is a sugar cane harvester that has an elevator that delivers harvested cane into a truck bed or wagon box that comprises the receiving area. Similarly, the material conveying vehicle can be a truck or other vehicle that carries spreadable material, and the target is the box of a sprayer. In yet another embodiment, the conveying vehicle is a vehicle that carries seeds that are unloaded into a planter that comprises the receiving area.

Also, the present discussion has used the term "automatically". In an example embodiment, "automatically" means that a function or step is performed without any manual steps.

The present discussion has also mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device. They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
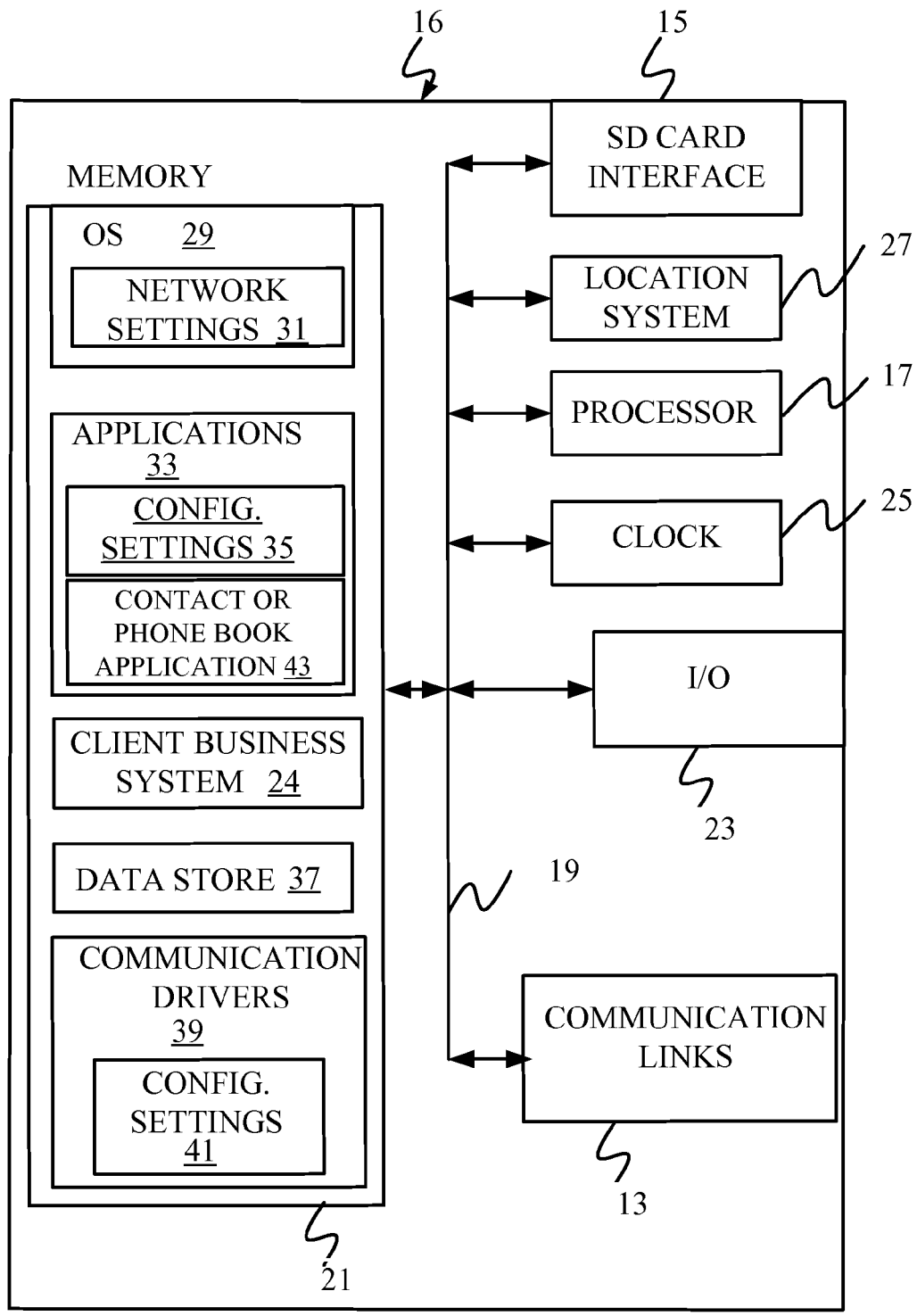
FIG. 5 is a block diagram of one embodiment of a mobile device that can be used to implement some portions of the conveying vehicle, shown in FIGS. 2A and 2B.

The control system 116 can be implemented on a variety of different devices, such as mobile devices or other computing devices. FIG. 5 provides a general block diagram of the components of a mobile device 16 that can run components of control system 116. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication through one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like mobile agricultural application 160) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 can comprise vehicle position sensor 159 and illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the settings 31 include things such as proxy information, Internet connection information, and mappings. Settings 35 include settings that tailor the application for a specific user. Settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
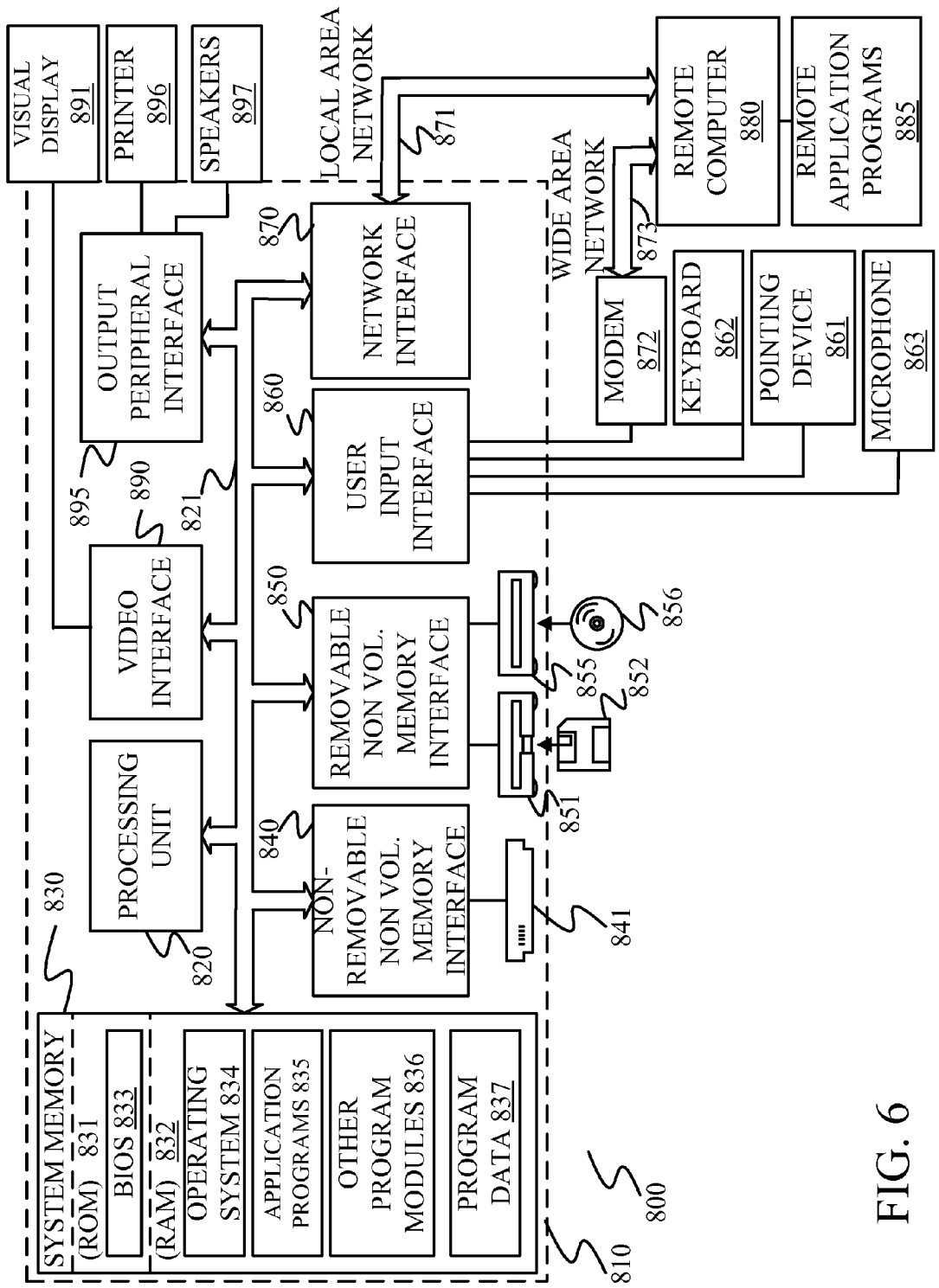
FIG. 6 is a block diagram of one illustrative computing environment.

FIG. 6 is one embodiment of a computing environment in which control system 116, or parts of it, (for example) can be deployed. With reference to FIG. 6, an exemplary system for implementing some embodiments includes a general-purpose computing device in the form of a computer 810. Components of computer 810 may include, but are not limited to, a processing unit 820 (which can comprise processor 130), a system memory 830, and a system bus 821 that couples various system components including the system memory to the processing unit 820. The system bus 821 may be any of several types of bus structures using any of a variety of bus architectures. Such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Memory and programs described with respect to FIG. 2 can be deployed in corresponding portions of FIG. 6.

Computer 810 typically includes a variety of computer readable media. Computer readable media can be any media (or a combination of media) that can be accessed by computer 810 and includes both volatile and nonvolatile media. The media can be removable or non-removable media. By way of example, and not limitation, computer readable media may comprise computer readable storage media and communication media. Computer readable storage media is different from, and does not include, a modulated data signal or carrier wave. It includes hardware storage media including both volatile and nonvolatile, removable and non-removable media implemented by any method or in any technology for storage of information such as computer readable instructions, data structures, program modules or other data. For instance, computer storage media includes, RAM, ROM, EEPROM, flash memory or other memory technology, CD-ROM, digital versatile disks (DVD) or other optical disk storage, magnetic disk storage or other magnetic storage devices, or any other medium which can be used to store the desired information and which can be accessed by computer 810. Communication media comprises computer readable instructions, data structures, program modules or other data in any information delivery media. The term "modulated data signal" means a signal that has one or more of its characteristics set or changed in such a manner as to encode information in the signal. By way of example, communication media includes wired network or direct-wired connection, and wireless media such as acoustic, RF, infrared and other wireless media.

The system memory 830 can include computer storage media in the form of read only memory (ROM) 831 and random access memory (RAM) 832. A basic input/output system 833 (BIOS), containing the basic routines that help to transfer information between elements within computer 810, such as during start-up, is normally stored in ROM 831. RAM 832 can store data and/or program modules that are immediately accessible to or are being operated on by processing unit 820, like operating system 834, applications 835, other program modules 836 and other data 837.

The computer 810 may also include other computer storage media. FIG. 6 shows a hard disk drive 841 that reads from or writes to magnetic media, a magnetic disk drive 851 that reads from or writes to a removable, magnetic disk 852, and an optical disk drive 855 that reads from or writes to a removable, optical disk 856 such as a CD ROM or other optical media. The hard disk drive 841 can be connected to the system bus 821 through a memory interface such as interface 840, and magnetic disk drive 851 and optical disk drive 855 can be connected to the system bus 821 by a memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 can be operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. For instance, FIG. 6 illustrates remote application programs 885 as residing on remote computer 880. It will be appreciated that the network connections shown are exemplary.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
    sensing on a conveying vehicle, a position signal that indicates an actual position of a movable receiving vehicle, that receives material, relative to a loading device, operably coupled to the conveying vehicle;
    automatically positioning the loading device, based on the actual position of the movable receiving vehicle relative to the loading device;
    generating an operator interface output indicative of the actual position of the movable receiving vehicle relative to the loading device;
    receiving an operator unloading input; and
    automatically unloading material from the loading device at the movable receiving vehicle in response to receiving the operator unloading input.

2. The method of claim 1 wherein generating an operator interface output comprises:
    displaying an operator display showing the relative position of the loading device relative to the movable receiving vehicle.

3. The method of claim 2 wherein displaying comprises:
    displaying an orientation of the loading device relative to an orientation of the movable receiving vehicle to visually indicate whether the loading device is in an unloading position relative to the movable receiving vehicle.

4. The method of claim 1 wherein automatically positioning the loading device comprises:
    automatically positioning the loading device at a lift height relative to the movable receiving vehicle.

5. The method of claim 1 wherein automatically positioning comprises:
    determining whether the loading device is carrying the material; and
    if so, enabling the automatic positioning of the loading device.

6. The method of claim 1 wherein sensing a position signal comprises:
   sensing a position and orientation of the movable receiving vehicle;
   sensing a position and orientation of the loading device; and
   calculating the relative position of the loading device based on the sensed position and orientation of the moveable receiving vehicle and the sensed position and orientation of the loading device.

7. The method of claim 6 wherein sensing a position and orientation of the movable receiving vehicle comprises:
   using a scanning laser to identify a location of a periphery of the movable receiving vehicle.

8. The method of claim 6 wherein sensing a position and orientation of the movable receiving vehicle comprises:
   using an image capture sensor to identify a location of a periphery of the movable receiving vehicle.

9. The method of claim 1 and further comprising:
   calculating a positioning rate of the loading device, the positioning rate being indicative of a rate at which the loading device is positioned relative to a frame of the conveying vehicle; and
   automatically controlling a travel speed of the conveying vehicle, based on the positioning rate of the loading device.

10. The method of claim 9 wherein automatically controlling a travel speed comprises:
    automatically controlling the travel speed based on the relative position of the loading device relative to a position of a sensed item.

11. The method of claim 10 wherein automatically controlling the travel speed comprises:
    determining the travel speed of the conveying vehicle;
    determining whether the loading device is movable to a contact avoidance position to avoid contact with the sensed item based on the relative position of the loading device, the positioning rate and the travel speed of the conveying vehicle; and
    if the loading device is not movable to the contact avoidance position, controlling the travel speed of the conveying vehicle so the loading device is movable to the contact avoidance position.

12. The method of claim 1 wherein the loading device on the conveying vehicle comprises a bucket on a loader and wherein the movable receiving vehicle comprises a truck bed of a dump truck, and further comprising:
    calculating a relative position of the bucket on the loader relative to the truck bed of the dump truck.

13. The method of claim 1 wherein the loading device on the conveying vehicle comprises a log carrying device on a log loader and wherein the movable receiving vehicle comprises a log carrier portion of a log carrying truck, and further comprising:
    calculating a relative position of the log carrying device on the log loader relative to the log carrier portion of the log carrying truck.

14. The method of claim 1 wherein the loading device on the conveying vehicle comprises a spout on a harvester and wherein the movable receiving vehicle comprises a box portion of a crop carrying vehicle, and further comprising:
    calculating a relative position of the spout on the harvester relative to the box portion of the crop carrying vehicle.

15. The method of claim 1 wherein the loading device on the conveying vehicle comprises a loading device on a spreadable material carrier and wherein the movable receiving vehicle comprises a box portion of a sprayer, and further comprising:
    calculating a relative position of the loading device on the spreadable material carrier relative to the box portion of the sprayer.

16. The method of claim 1 wherein the loading device on the conveying vehicle comprises a hopper and wherein the movable receiving vehicle comprises a truck bed of a truck, and further comprising:
    calculating a relative position of the hopper relative to the truck bed of the truck.

17. The method of claim 1 wherein the loading device on the conveying vehicle comprises an output end of an elevator on a cane harvester and wherein the movable receiving vehicle comprises a box portion of a cane carrying vehicle, and further comprising:
    calculating a relative position of the output end of the elevator on the cane harvester relative to the box portion of the cane carrying vehicle.

18. The method of claim 1 wherein the loading device on the conveying vehicle comprises a seed loading device and wherein the movable receiving vehicle comprises a seed carrying portion of a seeding vehicle, and further comprising:
    calculating a relative position of the seed loading device relative to the seed carrying portion of the seeding vehicle.

19. A method, comprising:
    automatically positioning a receiving vehicle based on an actual position of a material conveying machine relative to the receiving vehicle;
    generating an operator interface output indicative of the actual position of the material conveying machine relative to the receiving vehicle;
    receiving an operator loading input; and
    automatically loading material from the material conveying machine to the receiving vehicle in response to the operator loading input.

20. The method of claim 19 wherein generating the operator interface output comprises:
    displaying an operator display showing the relative position of the material conveying machine and the receiving vehicle.

21. The method of claim 20 further comprising:
    determining the actual position of the material conveying machine relative to the receiving vehicle.

* * * * *